United States Patent [11] 3,628,183

[72] Inventors Harry F. Strenglein; Frank M. Palka, both of Clearwater, Fla.
[21] Appl. No. 26,272
[22] Filed Apr. 7, 1970
[45] Patented Dec. 14, 1971
[73] Assignee Sperry Rand Corporation

[54] LIMITER-STABILIZED OSCILLATOR
2 Claims, 4 Drawing Figs.

[52] U.S. Cl. .......... 331/96, 331/75, 331/109, 331/183, 333/82 B, 333/73 C
[51] Int. Cl. .......... H03b 3/02
[50] Field of Search .......... 331/96, 101, 109, 102, 75, 107, 183, 175

[56] References Cited

UNITED STATES PATENTS

| | | | |
|---|---|---|---|
| 3,393,378 | 7/1968 | Bene et al. | 331/117 |
| 3,245,014 | 4/1966 | Plutchok et al. | 333/73 C |
| 3,521,199 | 7/1970 | Wehner | 333/73 C |

*Primary Examiner*—John Kominski
*Attorney*—S. C. Yeaton

ABSTRACT: A high carrier-frequency semiconductor diode oscillator is frequency stabilized against variation in loading and amplitude modulation noise in its output is reduced by utilization of a limiter-diode of the PIN type in its output transmission line.

INVENTORS
HARRY F. STRENGLEIN
FRANK M. PALKA
BY
H P Terry
ATTORNEY

INVENTORS
HARRY F. STRENGLEIN
FRANK M. PALKA
BY
ATTORNEY

LIMITER-STABILIZED OSCILLATOR

BACKGROUND OF THE INVENTION

1. Field of the Invention

The invention pertains to high-frequency oscillators of the type in which the active driving element is a biased diode and more particularly pertains to high-frequency diode oscillators and limiter means for stabilizing them against load variations.

2. Description of the Prior Art

Prior art microwave and other high carrier-frequency oscillators are available in a variety of forms that have various degrees of inherent stability. Such oscillators, when reasonably stable, may often be further stabilized to some degree against the effects, for instance, of variation of load impedance by any one of several known approaches. For example, the correcting influence of high Q temperature and otherwise stable cavity resonators has been employed with certain success by closely coupling the stabilized cavity resonator to the oscillator resonant circuit. The use of isolating elements, including lossy elements or pads and ferrimagnetic isolators, has aided in diminishing the effects of load variations. Active automatic frequency control servomechanisms are employed with some success.

The prior art approaches cited above all involve relatively large, heavy, and complex equipment and therefore are relatively high in initial cost and have expensive maintenance requirements. In addition, the stabilizing external cavity resonator destroys the oscillator's electronic tuning capability and does not suppress amplitude modulation noise close to the carrier frequency. While the stable cavity causes minimal power loss and has high-frequency stability, it does not stabilize the oscillator's output power level.

Load isolators that minimize power loss, such as ferrite transmission line isolators, decouple the load with good effectiveness, but do not stabilize the power output of the oscillator or reduce incidental amplitude modulation signals adjacent the high-frequency carrier signal.

Active automatic frequency control servomechanisms, while causing little power loss and being adapted to correct the intrinsic thermal drift of the oscillator, have major problems associated with size, weight, and complexity. Further, such control systems often require the presence of a ferrite limiter, since available kinds of oscillators simply cannot deliver power into a seriously mismatched load. The requirement for the isolator further compounds the size and complexity features of the automatic frequency control approach.

SUMMARY OF THE INVENTION

The invention is a means for stabilizing the oscillation carrier frequency of a normally self-limiting oscillator, such as, for instance, a single-port high-frequency semiconductor diode oscillator circuit. Stabilization of the oscillator is achieved by the employment of a shunt-connected semiconductor limiter diode of special characteristics in the output transmission line of the oscillator. The limiter diode selected for the purpose has the property of not changing its resistance in substantial degree during a cycle of the carrier frequency. It is, however, capable of varying in resistance relatively more slowly over a fairly wide range when the carrier-frequency power incident upon it is varied.

DESCRIPTION OF THE INVENTION

Figure 1:
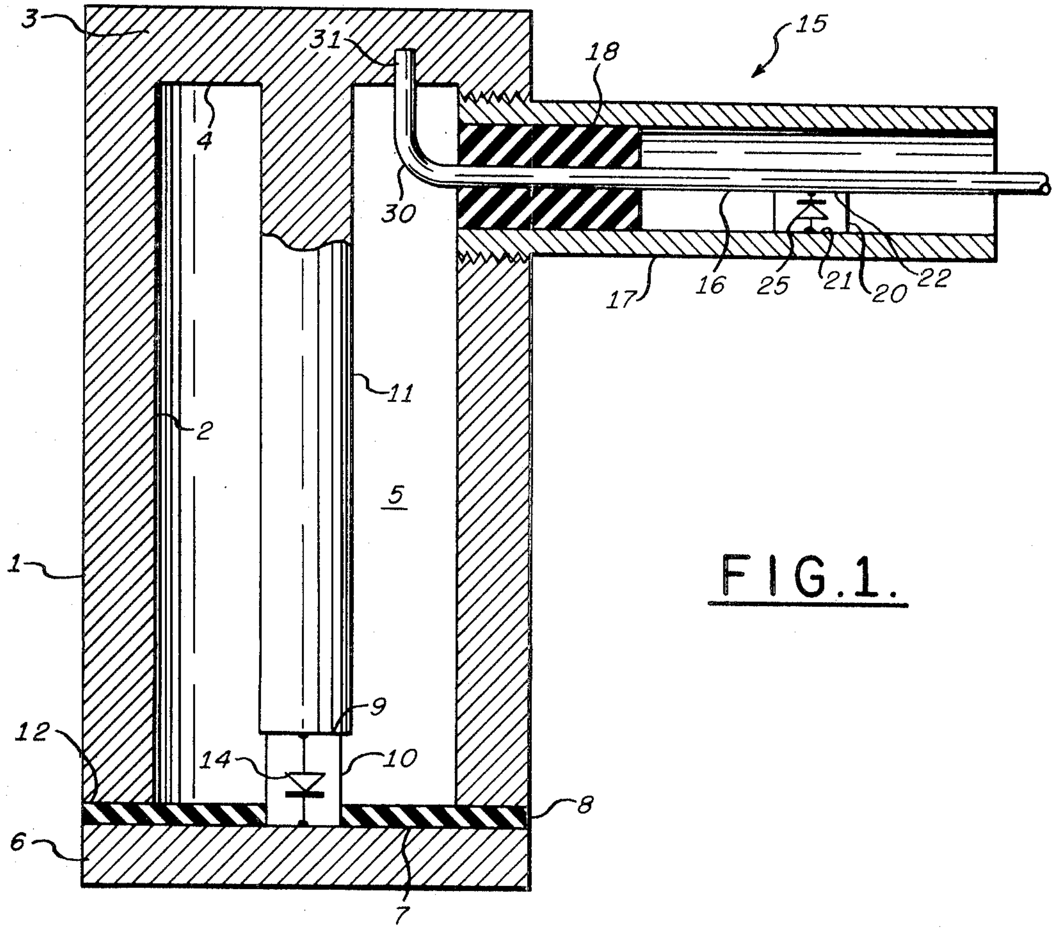
FIG. 1 is a plan view largely in cross section of a preferred embodiment of the invention.

Referring to FIG. 1, an embodiment of the invention in the form of a normally self-limiting oscillator such as a single-port hollow cavity resonator semiconductor-diode oscillator is shown including the inventive means for stabilization of its operation. In FIG. 1, the cavity resonator 5 is bounded by a circularly cylindric tubular wall 1 having a circularly cylindric interior surface 2. Preferably, the material of wall 1 is selected to present good electrical conductivity of the operating high carrier frequency, so that surface 2 has high conductivity for such high-frequency carrier currents. One end of cavity 5 is closed by a flat wall 3; wall 3 may be formed integrally with wall 1 so that it has, adjacent the interior of cavity 5 bounded in part by it, a surface 4 also of good high-frequency electrical conductivity.

Opposite wall 3, cavity 5 is further defined by a flat end wall or disk 6 having an interior surface 7 also fabricated of a good electrically conductive material, especially wherever adjacent the interior of cavity 5. Wall or plate 6 is not formed integrally with tubular wall, but is a physically discrete part. For reasons that will become apparent, wall or plate 6 is electrically insulated from wall 1. Such insulation is provided by an annular flat washer or ring 8 of mica or other suitable low-loss dielectric material. Ring 8, as will become apparent, provides high-frequency capacitive coupling between the surface 7 of end wall 6 and the currents flowing on conducting surface 2 of wall 1. Dielectric ring 8 and end wall 6 may be bonded or fastened to the end 12 of all 1 in any well-known manner.

Surface 4 of end wall 3 of cavity resonator 5 is electrically coupled to the opposed end wall 6 by means including active semiconductor or diode element 10 in series relation with half-wave transmission line 11. It is understood that line 11 may be made integral with end wall 3 and that they may both be constituted of the same electrically conducting material. Furthermore, it is understood that line 11 may be one half-wave length in axial dimension, where the wavelength referred to is associated with the desired operating high carrier frequency of the oscillator device.

Semiconductor diode 10 is a commercially available microwave or high-frequency diode, for example, of the avalanche transit time type, although microwave diodes operating according to other energy converting mechanisms may be employed, including other than negative resistance converters. Diode 10 is shown for convenience in FIG. 1 in full view and, for ease of understanding its relation to associated elements of the apparatus, a schematic indication 14 of its polarization is illustrated as if it were actually drawn on the cylindrical outer surface of the diode package. Diode 10 is bonded to the interior conducting surface 7 of end wall 6 by any suitable known method and is similarly conductively bonded to the flat end 9 of transmission line 11. Line 11 acts as an impedance matching element in the familiar manner in the operation of the oscillator cavity 5 and also serves as a bias supply line for diode 10. A bias voltage source (not shown) attached to end wall 6 and at any point in FIG. 1 above the level of the insulating washer 8 provides an energizing unidirectional bias voltage across microwave diode 10. Diode 10 operates as an active element for converting the energy supplied by the bias source into high-frequency carrier oscillations.

For the purpose of abstracting such high-frequency carrier energy from cavity 5, any of several available types of coaxial output transmission line systems may be employed, as at 15. For example, line 15 may be a coaxial transmission line having an inner conductor 16 and a coaxially aligned hollow outer conductor 17. Inner conductor 16 is conveniently supported in concentric relation with outer conductor 17 by one or more beads such as apertured bead 18 made of a dielectric material having very low electrical loss characteristics at the operating carrier frequency. The outer surface of conductor 17 is provided at one end with threads whereby it is fastened within a threaded hole passing through wall 1.

Outer conductor 17 and dielectric bead 18 may physically end at surface 2 of wall 1 with a flat or rounded end surface conforming to the shape of cylindrical surface 2. However, inner conductor 16 extends into cavity 5 for the purpose of coupling to the high-frequency carrier fields withing cavity 5. A capacitive disk may be employed, capacitively to couple to such interior fields. As shown in FIG. 1, an inductive loop may preferably be formed by bending inner conductor 16 upward to form the vertical segment 30 of the coupling loop whose end is fastened within a bore 31 in wall 3. A return path for any unidirectional current components arising in limiter-diode 20 is readily taken through outer conductor 17, walls 1 and 3 of cavity resonator 5, coupling loop segment 30, and inner conductor 16. Should a capacity probe be used to couple to the electromagnetic fields within cavity resonator 5 in place of coupling device 30, a return path for such unidirectional currents may be provided in a well-known manner. A blocking capacitor may be provided in shunt within conductor 16 on the side of limiter-diode 20 remote from dielectric bead 18 should there be any possibility of stray unidirectional currents flowing into transmission line 15 from utilization apparatus. Known types of tuning devices may be employed, if desired, to alter the center frequency of cavity 5 and therefore of the carrier signals generated within it. Different types of oscillator-resonator configurations may be employed to supply normally self-limiting oscillations.

In accordance with the present invention, a diode 20 is placed in shunt in output transmission line 15. Diode 20 is shown for convenience in FIG. 1 in full view and, for ease of understanding its relation to associated elements, a schematic indication 25 of its polarization is illustrated as if it were actually drawn on the cylindrical outer surface of the diode package. Diode 20 is bonded at a first end to the high-frequency conducting surface 22 of inner conductor 16 of transmission line 15 by any suitable known bonding method. Diode 20 is similarly conductively bonded at its second end to the inner conducting surface 21 of the outer hollow conductor 17 of line 15.

Diode 20 is preferably a semiconductor diode, such as a PIN diode of which various types are available on the market. The kind of device used as diode 20 is selected because of certain characteristics it must have. For example, the diode 20 is required according to the invention to have the property of not changing its apparent resistance in substantial degree during a carrier cycle. A PIN diode has such a property, since the stored charge in the type *i* conductivity region of the semiconductor device has a lifetime of tens of nanoseconds. Consequently, its impedance cannot change significantly during a high-frequency carrier cycle. A stored charge lifetime of substantially 25 nanoseconds is preferred.

Several theories have been advanced to explain the unusual and unexpected behavior of diode 20 in stabilizing the operating carrier frequency of the inventive oscillator. No theory of operation is advanced herein with a view of restricting the invention to such theory of operation, and the following discussion is offered simply as an aid in understanding a view of a mode in which it possibly operates.

Assume the existence of a generalized oscillator formed by shunting a negative resistance device functioning as the active element in the oscillator with a positive resistance such that the gain of the circuit is greater than unity. As is also true of the oscillator of FIG. 1, without diode 20 in circuit, assume that the reactances of the oscillatory circuit are tuned to resonance. Using the conventional explanation of electronic oscillators, the amplitude of oscillation of the circuit progressively builds up at a rate determined in part by the excess in gain of the oscillator over unity gain and in part by the well-known quality factor Q of the resonant circuit. The amplitude of oscillation continues to expand until the average negative resistance just equals the positive resistance of the load coupled to the oscillator. The factor above referred to as average negative resistance consists of the substantially fixed negative resistance of the normal type, plus a widely varying or dynamic term existing over some part of the carrier cycle. Such widely varying dynamic term will comprise a near infinite resistance or a short circuit, depending on the quadrant of the negative resistance. It is clear that power cannot be dissipated in either a short circuit or in an open circuit or infinite resistance. Thus, in the portions of the carrier-frequency cycle in which power dissipation is foreclosed, the circuit associated with oscillator diode 10 looks like a reactance. Such is demonstrated by measurements made of the negative resistance and reactance properties of known avalanche transit time diodes.

Figure 2:
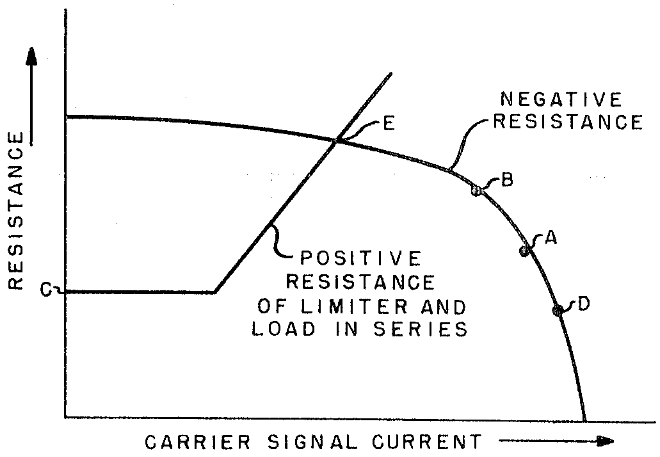
FIG. 2 is a graph useful in explaining the operation of the invention.

For a given load resistance, the above-described oscillations stabilize, for example at point A on the curve of FIG. 2, which curve plots negative resistance in ohms versus carrier signal current in milliamperes. If the load resistance only should change, the oscillation level will stabilize at a new point, such as point B. Such an event also changes the reactance of the circuit, as a consequence of which property, the oscillator is seen to be reactance turnable. It is furthermore seen that, in order to achieve a design for an oscillator which starts readily and does not stall readily, it is necessary to operate on the part of the curve of FIG. 2 which varies rapidly so that small changes in load resistance cannot put the oscillator system in the forbidden region in which oscillation is not possible.

Referring again to the novel oscillator system shown in FIG. 1, but with PIN diode 20 placed in circuit, it has been observed that limiter diode 20, because of its inherent characteristics, behaves in effect as a simple resistor whose value cannot change in any substantial degree during one carrier-frequency cycle. However, it is a PIN diode capable of varying in resistance relatively more slowly over a fairly wide range when the carrier-frequency power incident upon it is varied.

As a consequence of the use of a PIN diode 20 having such relatively slowly varying resistance characteristics, the oscillator with the PIN limiter diode 20 in shunt circuit in line 15 will start operation at a new point, for example, such as point D on the curve of FIG. 2, with ready starting capability, but will now ultimately stabilize at point E farther up the curve of FIG. 2 past point B.

With operation at point E, the important result obtains that variations in the effective load resistance of the oscillator circuit are largely compensated, since any such variations in effective load resistance simply causes a shift in carrier current level not on a steep part of the curve of FIG. 2 and consequently not in a region of rapid variation of reactance. Thus, the carrier frequency of the novel oscillator circuit is stabilized against load variations.

Limiter diode 20 thus operates as a resistance having very nearly constant value over a high carrier-frequency cycle. The use of known types of semiconductor limiting devices, such as clipping limiters, varactors, or other such devices which change impedance drastically during one high carrier-frequency cycle when used in place of limiter diode 20 would be accompanied by a significant reactance change, making the oscillator unstable rather than effecting desired stabilization. It is seen that the limiter diode 20 reduces the feed back gain of the oscillator substantially to unity by a mechanism other than saturation of the active diode 10 of the oscillator; consequently, diode 20 acts substantially as a linear device whose characteristics vary only slightly with carrier signal level. Accordingly, it is adapted to absorb reflected power without change in its effective impedance, thus avoiding any tuning of the oscillator.

Limiter diode 20 is placed in transmission line 15 at a location with respect to any convenient reference plane, such as the reference plane of oscillator diode 10, of somewhat critical nature. However, such criticality does not substantially influence the limiter function of diode 20, but is rather concerned with diminishing the effects of normal behavior in many kinds of cavity resonator oscillators exhibited when a reactive load (such as a stable cavity resonator) is connected by an improper length of transmission line. For certain undesired line lengths, the output spectrum may break up, reflecting multiple mode or other undesired operation of the oscillator. Such line lengths are normally to be avoided. Thus, the transmission line 15 and any reflection due to limiter diode 20 do not merely act as an external resonant circuit coupled to cavity resonator 5.

The intrinsic insertion loss of the limiter diode 20 appears to account for about half the load decoupling or static limiting action achieved in the novel oscillator. The remaining beneficial action of limiter diode 20 occurs because of an effective dynamic limiting action in diode 20 that prevents the carrier-frequency current or voltage swing in the oscillator from reaching levels that would normally occur in the absence of limiter diode 20, in other words, the limit on the amplitude of oscillation is not set by saturation of the active oscillator diode 10. Operating essentially in a small signal condition, the parameters of active oscillator diode 10 are much less affected by changes in carrier signal level than they are near saturation. Consequently, the novel oscillator device is remarkably less affected by reflected power.

Figure 3:
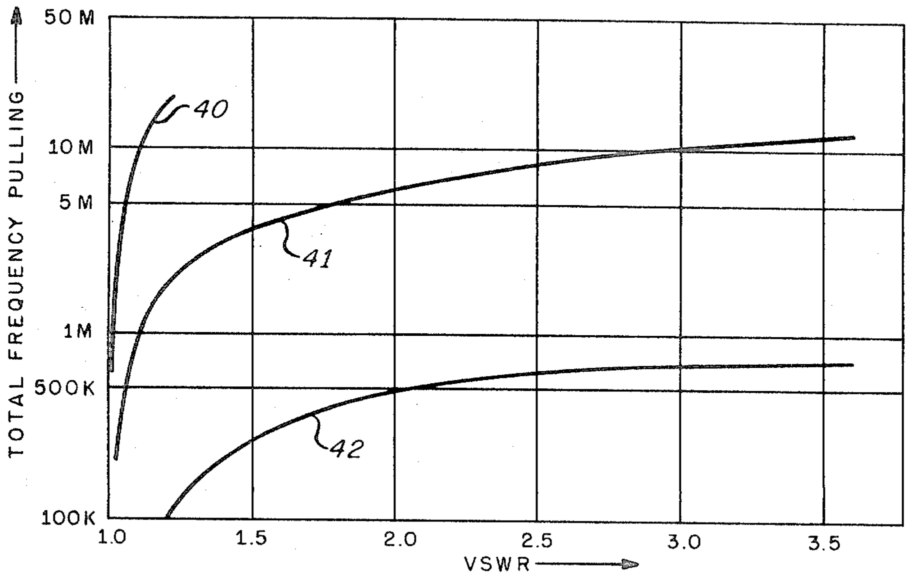
FIGS 3 and 4 are graphs showing the improved performance of the invention over the prior art.
Figure 4:
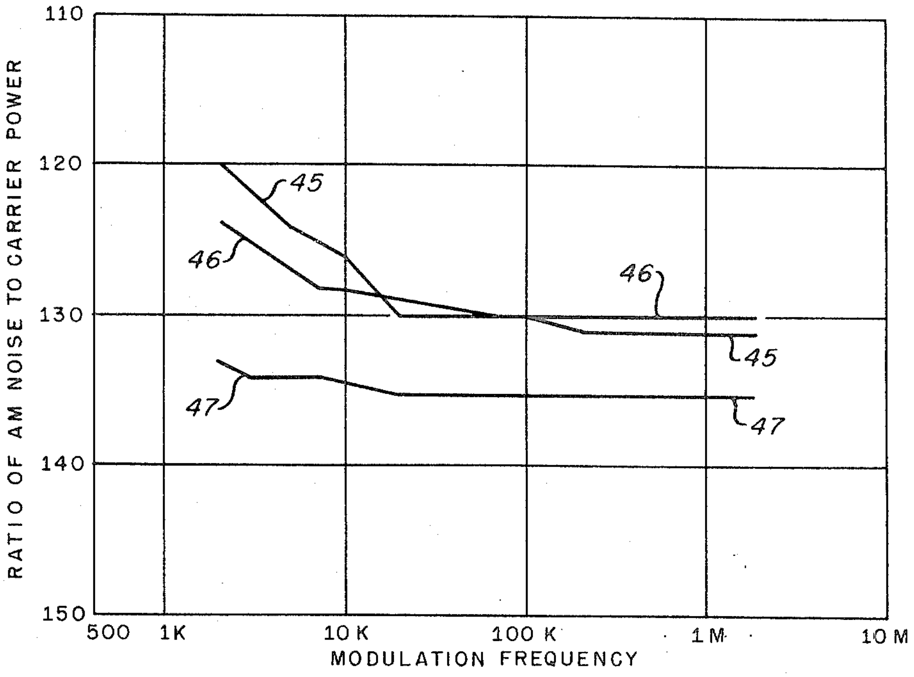

FIGS. 3 and 4 show measurements of significant parameters made upon a typical example of the invention. In FIG. 3, total frequency pulling in cycles per second in plotted against voltage standing wave ratio in the transmission line 15. Curve 40 presents the high-frequency sensitivity of a simple avalanche transit time diode oscillator to load changes, showing frequency pulling of over 100 megacycles per second for only minor changes in voltage standing wave ratio. Use of a 10 db. resistive pad in output transmission line 15 in the conventional manner produces the improvement shown by the curve 41, where frequency pulling of over 100 megacycles per second now corresponds to a range of voltage standing wave ratios going above 3.5. Insertion of limiter diode 20 in line 15 instead of the resistive pad produces the result shown in curve 41. Here, a range of 1.0 to 3.5 in voltage standing wave ratio produces a maximum frequency pulling effect of only a bit over 700 kilocycles.

FIG. 4 is a plot showing the amplitude modulation noise characteristics for the three situations illustrated in FIG. 3. Curve 45 shows the ratio of amplitude modulation noise to carrier frequency power in db. per 100 cycles per second plotted against modulation frequency in cycles per second for the basic avalanche transit time diode oscillator. Curve 46 shows similar data, using the 10 db. resistive pad; while performance is improved on the low-modulation frequency end of curve 46, there is a minor degradation for high-modulation frequencies. Curve 47 shows the greatly improved result using instead the limiter diode 20 which produces a considerable drop in the amplitude of the noise level. Curve 47 is also substantially flat, indicating that the effect is constant over a broad band of modulation frequencies.

It is within the scope of the invention to apply a unidirectional bias current to limiter diode 20 using any well-known means for introducing such a bias current through limiter diode 20 independently of the biasing of diode 10. It is possible, for example, to obtain substantially the same dynamic limiting effect at different insertion losses by varying the diode 20 bias level. As noted in the foregoing discussion, various types of known resonator configurations, may be employed in demonstrating the invention and various known kinds of tuning means may be employed therewith. The limiter diode 20 may be employed in a two-wire transmission line coupled to the normally self-limiting oscillator, if desired, or with other types of transmission lines adaptable to such usage.

The limiter diode 20 has substantially no effect on the apparent load on the oscillator so long as the voltage across the diode 20 is small compared, for example, to its own contact potential. When the applied voltage becomes great enough to inject carriers into the intrinsic region of the diode, its resistance decreases. Since the limiter diode 20 is coupled to the oscillator active element 10 by a quarter-wave matching structure inherent in the oscillator structure, a decrease in limiter resistance appears as an increase in the resistance in series with the active element.

The degree of amplitude stabilization and the reduction of pulling both improve as the rate of change of the impedance of diode 20 with average signal current increases. If line CE became vertical (i.e., rate of change of resistance with signal current is finite), the amplitude variations inherent in the oscillator would be suppressed entirely and the operating point would not change at all with variations in C, the load resistance, so long as C remained within the negative resistance curve of FIG. 2.

The time response of the PIN diode 20 is a compromise between several factors. If the change of resistance which can occur during a single carrier cycle were substantially zero, the reduction of pulling figure for slowly varying loads would be optimized, since the diode 20 would exhibit no change in reactance with signal level. On the other hand, the noise reduction would vanish for modulation frequencies quite close to the carrier (i.e., line 47 of FIG. 4 would intersect line 46 at a low-modulation frequency) and the pulling figure reduction would not be effective for rapidly changing loads. These considerations lead to the use of a limiter diode 20 having a charge storage time of about 25 nanoseconds.

According to the invention, stabilization against load variations in a normally self-limiting oscillator is achieved in a structure having considerable advantages in reduced weight, complexity, size, and expense of manufacture and maintenance as contrasted with prior art devices. Power output of the oscillator is stabilized and amplitude modulation noise is significantly reduced. The voltage tunability of the oscillator is not reduced in any substantial degree; accordingly, frequency-modulated operation of the oscillator can be accomplished with the generation of very little incidental amplitude modulation of the carrier. The oscillator device of the present invention is physically much smaller than prior art devices and in addition stabilizes output power and reduces noise generation while reducing frequency pulling. Furthermore, it does not prohibit electronic tuning over a reasonable frequency range.

While the invention has been described in its preferred embodiment, it is to be understood that the words which have been used are words of description rather than limitation and that changes within the purview of the appended claims may be made without departure from the true scope and spirit of the invention in its broader aspect.

We claim:

1. In a high-frequency oscillator having cavity resonator wall means for confining a high-frequency field generated by said oscillator, the improvement comprising:

high-frequency output transmission line means having first and second concentric electrical current conductor means conductively coupled to said wall means for propagating said high-frequency field from said cavity resonator, semiconductor diode limiter means coupled within said transmission line means between said first and second transmission line current conductor means and having a substantially constant resistivity during any one cycle of said oscillating high-frequency field, said resistivity varying solely in response to the amplitude of said high-frequency field over many cycles of exposure thereto, said first and second current conductor means, said diode limiter means, and said cavity resonator wall means being cooperatively coupled for providing a series circuit path for permitting flow of unidirectional current arising in said diode limiter means in response to said high-frequency field.

2. Apparatus as described in claim 1 wherein said semiconductor diode limiter means comprises a PIN semiconductor diode so characterized and so arranged as cooperatively to supply limiting action at a level lower than that characterizing self-saturated operation of said high-frequency oscillator.

* * * * *